(No Model.)
C. H. JACOT.
MUSIC BOX DAMPER.
No. 461,633. Patented Oct. 20, 1891.
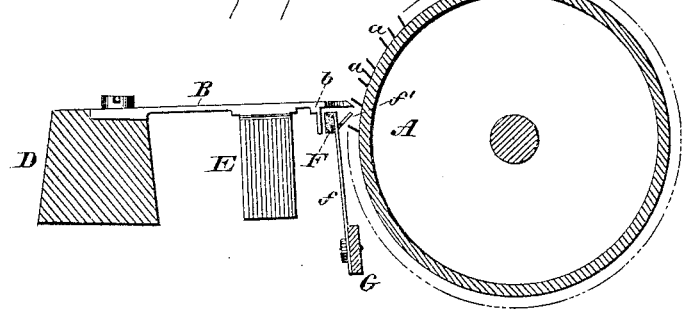
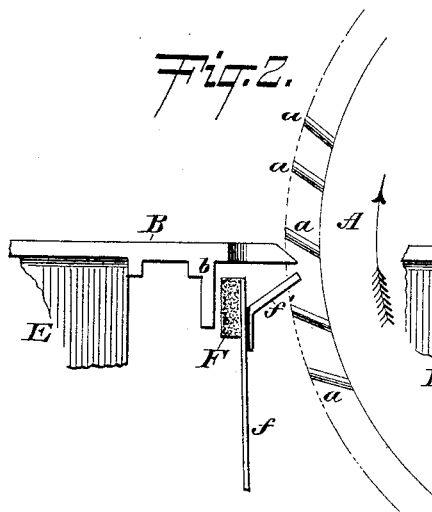
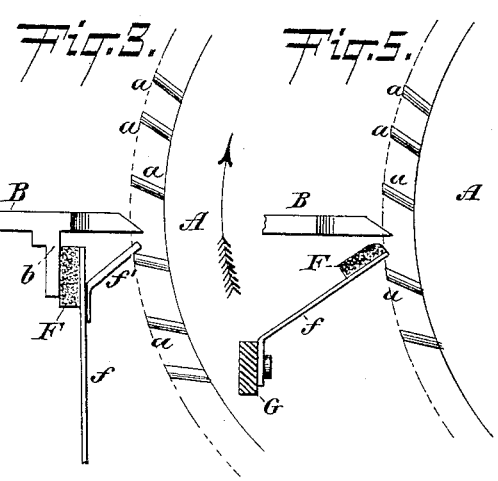
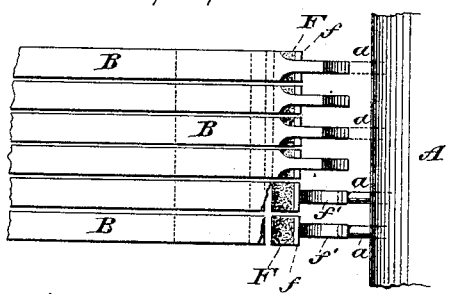
WITNESSES:
Gustave Dieterich.
William Goebel.
INVENTOR
Charles H. Jacot
BY Briesen & Knauth
his ATTORNEYS.

UNITED STATES PATENT OFFICE.

CHARLES H. JACOT, OF STAPLETON, ASSIGNOR TO JACOT & SON, OF NEW YORK, N. Y.

MUSIC-BOX DAMPER.

SPECIFICATION forming part of Letters Patent No. 461,633, dated October 20, 1891.

Application filed November 3, 1890. Serial No. 370,151. (No model.)

*To all whom it may concern:*

Be it known that I, CHARLES H. JACOT, a resident of Stapleton, Richmond county, Staten Island, in the State of New York, have invented an Improvement in Music-Box Dampers, of which the following is a specification.

My invention relates to an improvement in music-boxes; and it consists in combining with the tooth an independent damper, so that the vibrations of the tooth may be checked before the next attack is made upon the same. A peculiar hissing and unmusical sound is produced if a tooth in vibration is struck by a cylinder-pin, were it not for the intervention of a suitable damper to check the vibrations of the previous attack.

My object is to provide a damper that shall be of simple construction and adjustment and that will not easily get out of repair. To accomplish this object I use the mechanism illustrated by the accompanying drawings, wherein—

Figure 1 is a side view of my damper as it stands in connection with the cylinder and comb of a musical box. Fig. 2 is an enlarged side view of my damper out of action. Fig. 3 is an enlarged side view of my damper in action. Fig. 4 is an enlarged plan view of my damper and of a portion of the cylinder and of several teeth. Fig. 5 is a side view of a modification of my invention.

A is a musical-box cylinder. $a\ a$ are pins in said cylinder, which contact at intervals with the comb-teeth B, which comb is suitably fastened to the standard or frame D.

E represents a weight such as is usually attached to the teeth in the lower register of a musical box.

$b$ is a projection or ear extending downward from the tooth B, against which the damper is intended to bear in checking the vibrations of the tooth.

F is the damper proper, preferably made of felt. $f$ is the shank of said damper, preferably in form of a spring, which shank is suitably fastened at its lower end to a frame G. Normally the damper F is out of contact with the comb-tooth B.

$f'$ is an arm, which I prefer to have extend from the damper-shank $f$ toward the cylinder A, and with which the pins $a$ on said cylinder contact to force the damper F against the projecting ear $b$ or against the body of the tooth B.

It will be seen that each tooth must be supplied with an additional damper, so that as the cylinder A revolves in the direction indicated by the arrows in Figs. 2 and 3, and the pins $a$ approach a tooth, they must first engage with the damper, throwing it against the tooth and causing the vibrations of said tooth to cease. The cylinder continuing to revolve, carries on the pin $a$ until it slips by the damper and allows the damper to spring or drop away from the tooth, thereby preparing the tooth to receive the attack from the pin $a$.

Fig. 5 shows that the arm $f'$ and the ear $b$ are not essential to the embodiment of my invention, although I prefer the form shown in Figs. 2 and 3.

Heretofore fine damper-springs were secured directly to the comb-teeth to receive the first impact of the pins $a$ and to thereby arrest vibration; but these fine springs were very liable to get out of order, being easily broken, pushed aside, and difficult of adjustment. My damper, being wholly disconnected from its tooth B, is always reliable and will not be affected by longitudinal displacement of the cylinder. The damper F, instead of being constructed of felt or analogous material, may be made of metal.

Having now described my invention, I claim—

1. The combination, in a musical box, of the comb-tooth B, with the independently-supported damper F and with the pin-cylinder A, the damper being normally out of contact with the tooth B, substantially as herein shown and described.

2. The combination, in a musical box, of the comb-tooth B, with the independently-supported damper F and spring-shank $f$ thereof and with the pin-cylinder A, said damper being normally out of contact with the tooth B, substantially as herein shown and described.

3. The combination, in a musical box, of the comb-tooth B, with the independently-supported damper F, having projecting arm $f'$, and with the pin-cylinder A, substantially as herein shown and described.

4. The combination, in a musical box, of the comb-tooth B, having the projecting ear $b$, with the independently-supported damper F and with the pin-cylinder A, substantially as herein shown and described.

5. The combination, in a musical box, of the comb-tooth B, having the projecting ear $b$, with the independently-supported damper F and its spring-shank $f$, having the projecting arm $f'$, and with the pin-cylinder A, substantially as herein shown and described.

CHARLES H. JACOT.

Witnesses:
 ARTHUR V. BRIESEN,
 ROBERT C. MITCHELL.